United States Patent
Meyer-Graefe

(10) Patent No.: US 10,165,085 B2
(45) Date of Patent: Dec. 25, 2018

(54) ELECTRICAL INTERFACE MODULE

(71) Applicant: PHOENIX CONTACT GMBH & CO. KG, Blomberg (DE)

(72) Inventor: Karsten Meyer-Graefe, Hoevelhof (DE)

(73) Assignee: PHOENIX CONTACT GMBH & CO. KG (DE)

( * ) Notice: Subject to any disclaimer, the term of this patent is extended or adjusted under 35 U.S.C. 154(b) by 268 days.

(21) Appl. No.: 14/787,617

(22) PCT Filed: Apr. 28, 2014

(86) PCT No.: PCT/EP2014/058537
§ 371 (c)(1),
(2) Date: Oct. 28, 2015

(87) PCT Pub. No.: WO2014/177485
PCT Pub. Date: Nov. 6, 2014

(65) Prior Publication Data
US 2016/0080526 A1    Mar. 17, 2016

(30) Foreign Application Priority Data
Apr. 29, 2013   (DE) .................. 10 2013 207 760

(51) Int. Cl.
*H04L 29/06* (2006.01)
*G05B 19/042* (2006.01)

(52) U.S. Cl.
CPC .......... *H04L 67/42* (2013.01); *G05B 19/0423* (2013.01); *G05B 2219/21005* (2013.01);
(Continued)

(58) Field of Classification Search
CPC .. G05B 2219/21005; G05B 2219/2231; G05B 2219/2237; G05B 19/0423; H04L 67/42
See application file for complete search history.

(56) References Cited

U.S. PATENT DOCUMENTS 5,179,670 A    1/1993  Farmwald et al.
6,144,888 A   11/2000  Lucas et al.
(Continued)

FOREIGN PATENT DOCUMENTS

DE        100 58 524 A1    6/2002
DE   10 2005 025 645 A1   12/2006
(Continued)

OTHER PUBLICATIONS

International Search Report prepared by the European Patent Office on Apr. 28, 2014, for International Application No. PCT/EP2014/058537.
(Continued)

*Primary Examiner* — Kim T Nguyen
(74) *Attorney, Agent, or Firm* — Sheridan Ross P.C.

(57) ABSTRACT

An electrical interface module (IM) has a memory device MEM) for storing data and an integrated interface (IO) that provides data to an external reading device (RW). The electrical interface module (IM) contains a carrier (2) on which the memory device (MEM) and the integrated interface (IO) are arranged, the electrical interface module (IM) can exchange data and/or power with other electrical interface modules (IM) in the vicinity via the integrated interface, and adjacent electrical interface modules (IM) form a logical data bus via the integrated NFC interfaces, which can be addressed and/or controlled by at least one head module or a master module with a higher control and/or monitoring device.

6 Claims, 4 Drawing Sheets

(52) U.S. Cl.
CPC ............... *G05B 2219/2231* (2013.01); *G05B 2219/2237* (2013.01)

(56) References Cited

U.S. PATENT DOCUMENTS

| | | | |
|---|---|---|---|
| 6,766,143 | B1 | 7/2004 | Beckwith |
| 7,768,392 | B1 | 8/2010 | Brand et al. |
| 2002/0196789 | A1 | 12/2002 | Patton |
| 2003/0006878 | A1 | 1/2003 | Chung |
| 2003/0018930 | A1 | 1/2003 | Mora et al. |
| 2004/0218620 | A1* | 11/2004 | Palm ............... H04W 74/02 370/445 |
| 2004/0233855 | A1 | 11/2004 | Gutierrez et al. |
| 2005/0227707 | A1 | 10/2005 | Law et al. |
| 2006/0071785 | A1 | 4/2006 | Ahmed et al. |
| 2006/0074494 | A1 | 4/2006 | McFarland |
| 2006/0244565 | A1 | 11/2006 | Friedrich et al. |
| 2007/0027948 | A1 | 2/2007 | Engebretsen |
| 2008/0160925 | A1 | 7/2008 | Rofougaran |
| 2008/0272887 | A1 | 11/2008 | Brey et al. |
| 2009/0058609 | A1 | 3/2009 | Clayman |
| 2009/0096574 | A1 | 4/2009 | Oberle |
| 2009/0146839 | A1 | 6/2009 | Reddy et al. |
| 2009/0195363 | A1 | 8/2009 | Downie et al. |
| 2009/0319649 | A1* | 12/2009 | Larsen ............... H04L 41/0846 709/222 |
| 2010/0033307 | A1 | 2/2010 | Narendra et al. |
| 2010/0264211 | A1 | 10/2010 | Jain et al. |
| 2010/0265891 | A1 | 10/2010 | Belcea et al. |
| 2011/0286177 | A1 | 11/2011 | Attlesey |
| 2012/0098664 | A1 | 4/2012 | Nordin et al. |
| 2012/0181869 | A1 | 7/2012 | Chapel et al. |
| 2012/0249304 | A1 | 10/2012 | Liu et al. |
| 2013/0107853 | A1 | 5/2013 | Pettus et al. |
| 2014/0006893 | A1 | 1/2014 | Shetty et al. |
| 2014/0113652 | A1 | 4/2014 | Maguire |
| 2015/0055508 | A1* | 2/2015 | Ashida ............... H04L 41/04 370/254 |
| 2015/0280827 | A1 | 10/2015 | Adiletta et al. |
| 2016/0078260 | A1 | 3/2016 | Scholz et al. |
| 2017/0116145 | A1* | 4/2017 | Scholz ............... G06F 13/385 |

FOREIGN PATENT DOCUMENTS

| | | |
|---|---|---|
| DE | 10 2007 053078 A1 | 3/2009 |
| DE | 10 2012 016266 A1 | 2/2013 |
| DE | 102011082002 | 3/2013 |
| EP | 1 569 386 A2 | 8/2005 |
| EP | 2421344 | 2/2012 |
| EP | 2 464 204 A1 | 6/2012 |
| WO | WO 2012/105083 | 8/2012 |
| WO | WO 2015/150521 | 10/2015 |

OTHER PUBLICATIONS

German Search Report prepared by the German Patent Office on Oct. 18, 2013, for German Patent Application No. 102013207760.2.
International Search Report for International Patent Application No. PCT/EP2014/058533, dated Jun. 27, 2014, 2 pages.
German Search Report for German Patent Application No. 102013207755,6, dated Apr. 8, 2014, 10 pages.
International Search Report for International Patent Application No. PCT/EP2015/057321, dated Jun. 12, 2015, 2 pages.
German Search Report for German Patent Application No. 102014206387.6, dated Dec. 23, 2014, 12 pages.
Official Action for U.S. Appl. No. 14/787,577, dated Jan, 11, 2017, 16 pages.
Official Action for U.S. Appl. No. 14/787,577, dated May 17, 2017, 15 pages.
Notice of Allowance for U.S. Appl. No. 14/787,577, dated Mar. 29, 2018, 10 pages.
Official Action for U.S. Appl. No. 15/129,371, dated Apr. 5, 2018, 19 pages.
Official Action for U.S. Appl. No. 15/129,371, dated Oct. 2, 2018 20 pages.

* cited by examiner

ELECTRICAL INTERFACE MODULE

CROSS REFERENCE TO RELATED APPLICATIONS

This application is a national stage application under 35 U.S.C. 371 and claims the benefit of PCT Application No. PCT/EP2014/058537 having an international filing date of Apr. 28, 2014, which designated the United States, which PCT application claimed the benefit of German Patent Application No. 10 2013 207 760.2 filed Apr. 29, 2013, the disclosures of each of which are incorporated herein by reference.

FIELD

The invention relates to an electrical interface module.

BACKGROUND

Electrical interface modules are known from the prior art. They are often installed in larger electrical systems.

In relation to the present invention, electrical interface modules are generally understood as being electronic components of automation technology that are used in control cabinets of industrial facilities, for example. Some examples of electrical interface modules are electronic switching devices, engine control units, (Ethernet) network elements, fieldbus components and systems, I/O devices, relay and protective devices, industrial communication technology devices, measurement technology and control engineering devices, and monitoring and signaling devices.

This results in the problem that these components must be recorded in circuit diagrams, as well as the problem that they have to be identified and provided with comprehensive assembly instructions with respect to their connection and installation. A test record or the like must also be enclosed with each individual component.

The recording of individual components and the provision of identifiers is laborious. What is more, there is hardly enough space in larger circuit systems with relatively small installation space to add an individual identification.

Due to the lack of installation space, there are generally no assembly instructions within reach during installation and maintenance, so those must also be explicitly brought in for each component.

The increasing restriction of installation space also has the effect that visual displays are usually omitted, since they take up precious installation space.

At the same time, it would be desirable to obtain additional information about the components in order to enable plans to be made in advance for this kind of replacement or to recognize an impending breakdown before it occurs and replace the affected components on the basis of actual signs of aging.

In addition, it would be desirable for the breakdown of components to be easy to identify. Moreover, it would be desirable for the configuration of replacement components to be simple and fast.

SUMMARY

It is the object of the invention to provide an improved electrical interface module that circumvents one or more drawbacks of the prior art in an inventive manner.

The object is achieved according to the invention by the features of the independent claim. Advantageous embodiments of the invention are particularly indicated in the dependent claims.

BRIEF DESCRIPTION OF THE DRAWINGS

In the following, the invention is explained in further detail with reference to the enclosed drawing on the basis of preferred embodiments.

DETAILED DESCRIPTION

Figure 1:
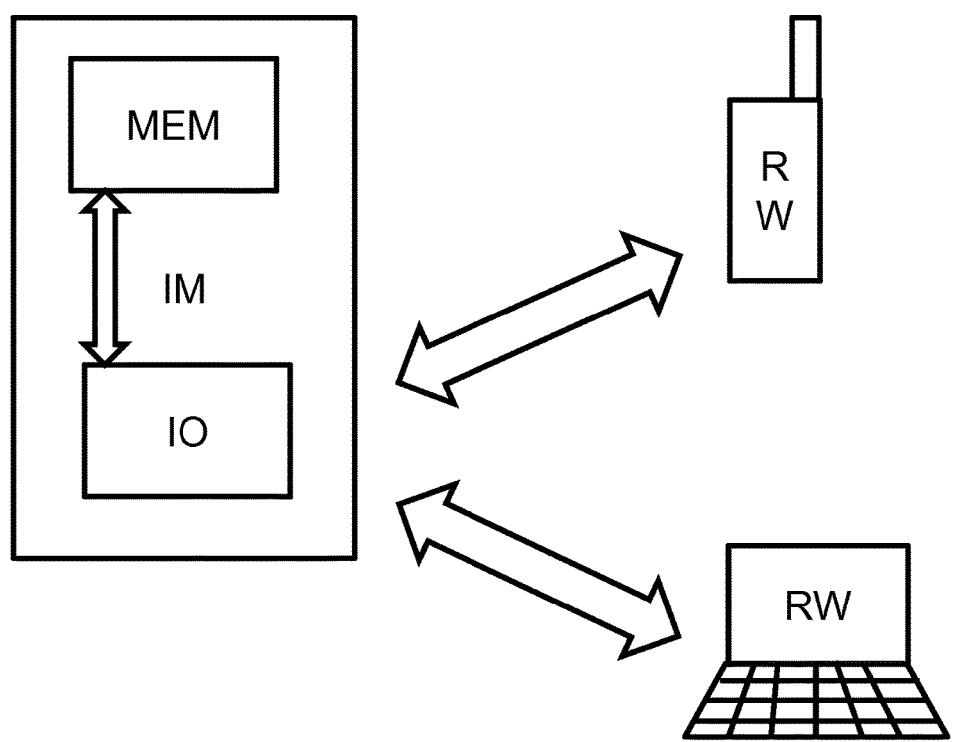
FIG. 1 shows a schematic representation of an electrical interface module according to a preferred embodiment of the invention.

FIG. 1 shows an electrical interface module IM according to a preferred embodiment of the invention.

The electrical interface module IM has a memory device MEM for storing data. Any suitable form of the memory can be used for this. For example, a flash memory or a NAND memory can be used as the memory, since they are able to hold the data without voltage. This is especially helpful if the corresponding component is currentless and no power supply is present.

Moreover, the electrical interface module IM also has an integrated IO interface that provides data to an external reading device, or reading and writing device RW. In addition, the requirements for galvanic isolation are thus rendered easier to achieve.

In one embodiment of the invention, the IO interface is a wireless NFC IO interface; however, the invention is not limited to wireless IO interfaces, but can also be implemented with conduction interfaces, for example with T-coupler branches into the modules, or using CAN-based, particularly multimaster-capable, systems.

Insofar as no reference is made in the following to a special characteristic of wireless communication, the remarks apply both to wired and to wireless IO interfaces.

The NFC IO interface can be set up so as to be active or passive. In a passive embodiment of the NFC IO interface, it does not require its own power supply; rather, the NFC IO interface is powered from the wireless energy of a reading writing device. This is especially advantageous if the corresponding component is currentless and no power supply is present. In addition, the requirements placed on galvanic isolation are rendered easier to achieve.

The data that are made available to the external reading device RW are selected from a group comprising: product data, particularly a serial number and/or batch number and/or a manufacturing date and/or a manufacturer identification and/or a place of manufacture, an instruction manual, assembly instructions, a reference to an Internet page, test data, particularly data on the final manufacturing inspection, status data, particularly error status, degradation, configuration data, particularly parameterization data.

A wealth of product-specific data is thus made available to a user of the electrical interface module IM according to the invention, enabling him to plan a targeted operation. In particular, the startup of a system is simplified substantially, since it is no longer necessary to keep assembly plans on hand.

Moreover, important access data of the electrical interface module IM are made available to the user, such as error status, degradation, configuration data, and particularly parameterization data, that are difficult to represent with conventional displays, particularly under the constraint of a small installation space.

In another embodiment of the invention, the data that are made available to the external reading device RW are selected from a group comprising: startup data, designation of an installation site, periodic inspection data, status indicator, readout via an external reading device RW, type of external reading device RW used, climate data for the installation site, particularly temperature and/or atmospheric humidity, mains voltage failure, functional range, parameter data, site identification.

Figure 2:
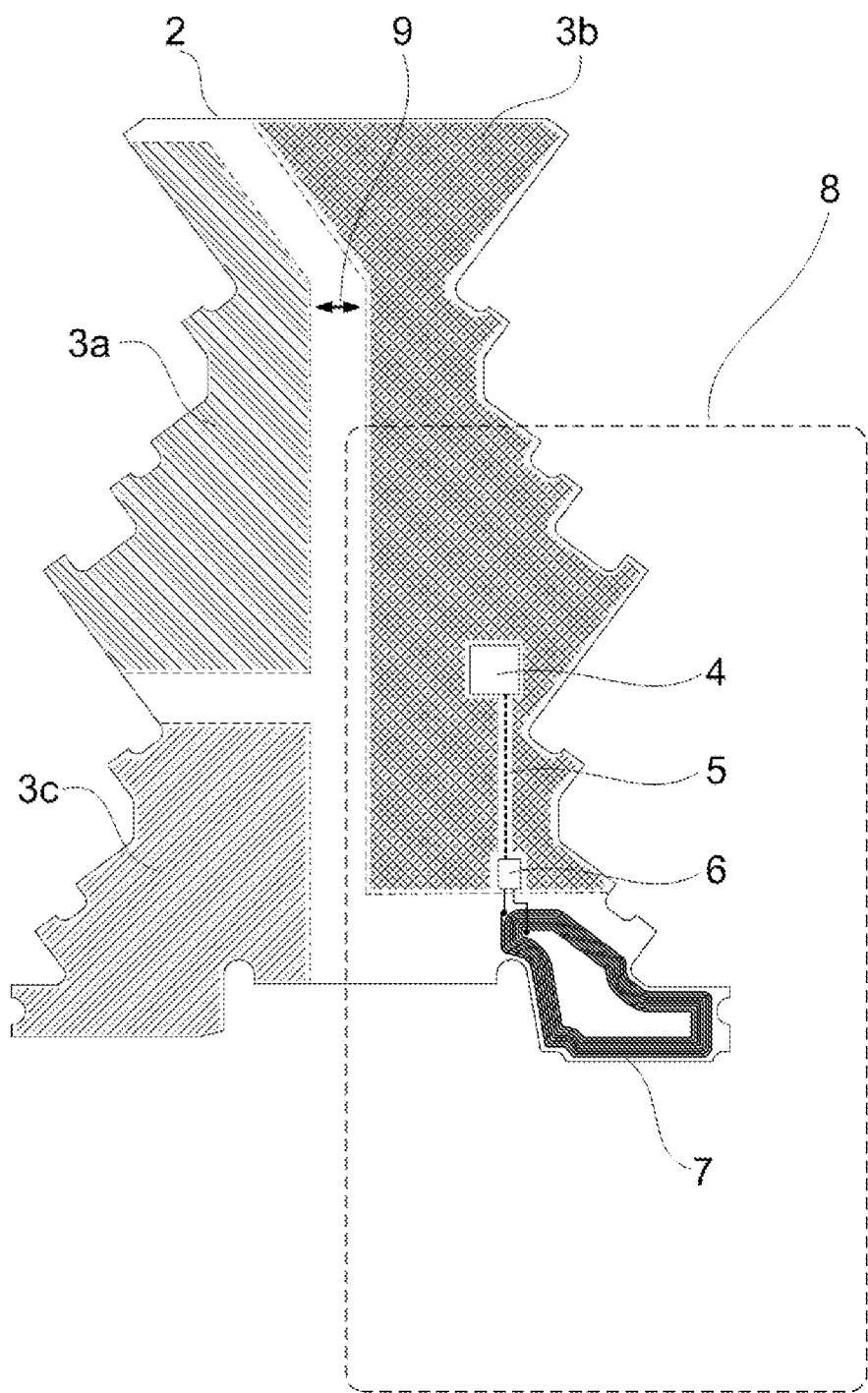
FIG. 2 shows an exploded schematic representation of an exemplary embodiment of an electrical interface module according to the invention.
Figure 3:
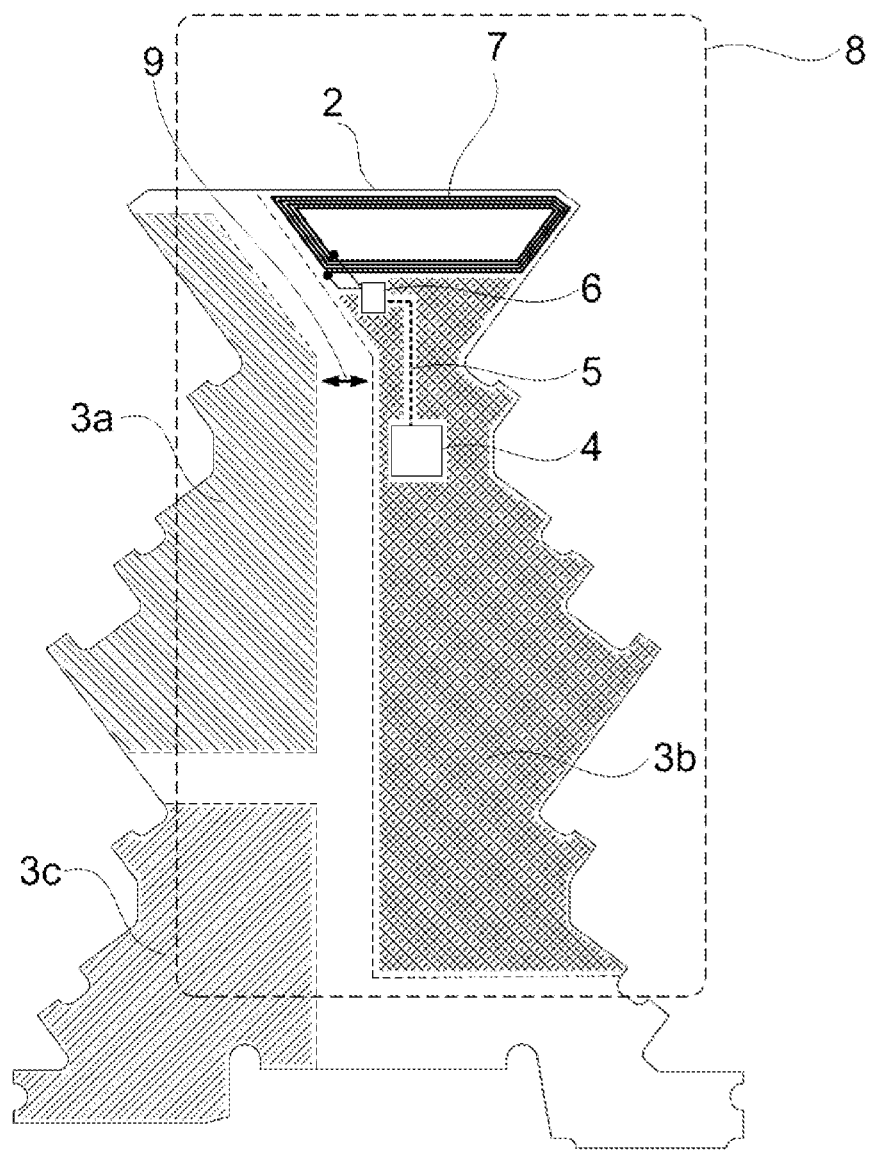
FIG. 3 shows an exploded schematic representation of another exemplary embodiment of an electrical interface module according to the invention.

These data simplify the inspection of an existing system. Moreover, it is possible to distinguish whether data are read in or out by means of a special reading device RW, such as, for example, by means of a laptop shown in stylized form at the bottom in FIG. 1, or with a smartphone application, such as, for example, by means of a mobile telephone 8 shown in stylized form at the top of FIG. 1 and in FIGS. 2 and 3. However, the invention is not limited to these embodiments; rather, other embodiments can involve a tablet PC, for example, as a reading device 8 [sic]. There are different possible orientations of the reading device RW, as shown in FIGS. 2 and 3 in relation to the respective (planar) antenna 7, and this can be dependent on the embodiment of the respective reading device RW or mobile telephone 8 and the respective electrical interface module IM.

In another embodiment of the invention, the integrated IO interface can be embodied such that data from an external writing device RW are made available and stored in the memory device MEM.

In this additional embodiment of the invention, it is preferred if the data made available by the external reading device RW are selected from a group comprising: product data, particularly a serial number and/or batch number and/or a manufacturing date and/or a manufacturer identification and/or a place of manufacture, an instruction manual, assembly instructions, a reference to an Internet page, test data, particularly data on the final manufacturing inspection, and information on reordering from the manufacturer. Through the provision of data registration, it becomes possible to store all of the relevant production data, particularly test data and serial numbers, after production of the electrical interface module IM without the need for physical contact access to the memory MEM.

In this additional embodiment of the invention, it is likewise preferred if the data that are made available by the external reading device RW are selected from a group comprising: startup data, designation of an installation site, periodic inspection data, readout via an external reading device RW, and type of external reading device RW used. These data simplify the inspection of an existing system.

In this additional embodiment of the invention, it is likewise preferred if the data that are made available by the external reading device RW contain configuration data for the operating mode of the electrical interface module IM. For instance, the configuration data can contain various characteristic temperature curves, voltage or current ranges or other customer-specific settings. As a result, the electrical interface module IM can be personalized or configured and/or parameterized with the aid of the IO interface.

This is particularly advantageous for the passive operating mode of the NFC IO interface, since individual configuration data can be written in a contactless manner to the memory MEM beforehand, for example when the electrical interface module IM is in the packaged state, and be available at startup for the interface module IM.

A provision can readily be made that at least a portion of the product-specific data is stored with write protection or password protection. At least a portion of the system-specific data can also be stored with write protection or password protection. Different protective mechanisms and/or passwords can thus be provided.

In addition, a provision can be made that the operating data field can only be read by use of an NFC interface.

Although the writing device and the reading device are described as separate devices, their functionality can also be available in combined form in one device.

By use of electrical interface modules IM according to the invention, the components can easily be recorded in circuit diagrams through data migration, for one thing; for another, however, the electrical interface modules IM can also be identified in accordance with the circuit diagrams. In addition, assembly instructions pertaining to connection and installation can also be made available by means of the electrical interface module IM according to the invention, so that they are always present at the installation site. As a result, separate storage or procurement of the assembly instructions is rendered unnecessary. What is more, a test record or the like can be enclosed with the electrical interface modules IM according to the invention.

Particularly in large control rooms in which little space is available, identification is substantially simplified and expediently enabled by the invention.

In addition, further displays can also be implemented by means of the electrical interface modules IM according to the invention that would otherwise not be possible based on available space requirements. In particular, the invention makes it possible to obtain additional data of the electrical interface module IM in order to plan a replacement in advance or to identify an impending failure and replace the components on the basis of actual signs of aging.

What is more, the use of interfaces offers the advantage that a larger quantity of data can be made available. In particular, the data can be stored as xml data.

The construction being presented particularly makes it possible to manufacture flat electrical interface modules IM, thus minimizing space requirements while making new functionality available. In particular, the construction being presented enables the provision of electrical interface modules IM having a width of less than 36 mm, particularly less than 23 mm, particularly less than 18 mm, particularly less than 13 mm, and especially preferably less than 7 mm.

For example, in the embodiment with a width of 7 mm, the construction enables a carrier 2, for example a printed circuit board, equipped on at least one side with an SMD and having the NFC IO interface and the actual interface elements. This carrier 2 can then be readily arranged in a narrow housing. Moreover, different regions 3a, 3b, 3c are identified on the carrier that are available, for example, for different tasks of the electrical interface module or of the components required for this. Alternatively or in addition, the different regions 3a, 3b and 3c can also designate different potential groups that are galvanically isolated from one another, for example, and can be connected with the aid of coupling elements. This kind of exemplary arrangement is shown in FIGS. 2 and 3.

Alternatively or in addition, a wired bus system can also be provided. In particular, an exemplary bus system can also be provided that is located in the mounting rail 11 and is contacted by the individual electrical interface modules IM upon placement onto the mounting rail 11.

In another embodiment, a provision is made that the carrier 2 has a planar antenna 7 for the integrated NFC IO interface. This enables an improved exchange between the individual electrical interface modules IM for one thing and flat electrical IM interface modules for another.

The integrated NFC interface can be constructed as shown schematically in FIGS. 2 and 3, for example. Besides the actual transmitting and receiving unit that is present in a chip 6, for example, the NFC IO interface can also have a planar antenna 7. It is readily possible in some embodiments for the chip 6 to also have the antenna 7 already built in, or an antenna can be added as a component, for example as a coil. Obviously, this kind of coil, which acts as an antenna 7, can also be embodied as an SMD-enabled component or as an antenna in the plastic housing or adhered to the housing wall by means of a film. In addition, a planar antenna can also be embodied as an independent component; otherwise, however, the planar antenna 7 can also be manufactured from conductor paths on the carrier 2. What is more, a connection with other parts is also established by means of a suitable connection on the electrical interface module IM. For the sake of example, a connection via another interface 5 to a controller 4 is shown in FIGS. 2 and 3. In addition to a 1-wire bus, exemplary interfaces can also have other serial or parallel interfaces or other interfaces, such as an $I^2C$ bus, for example. The controller can be a microcontroller or any other logic circuit.

Figure 4:
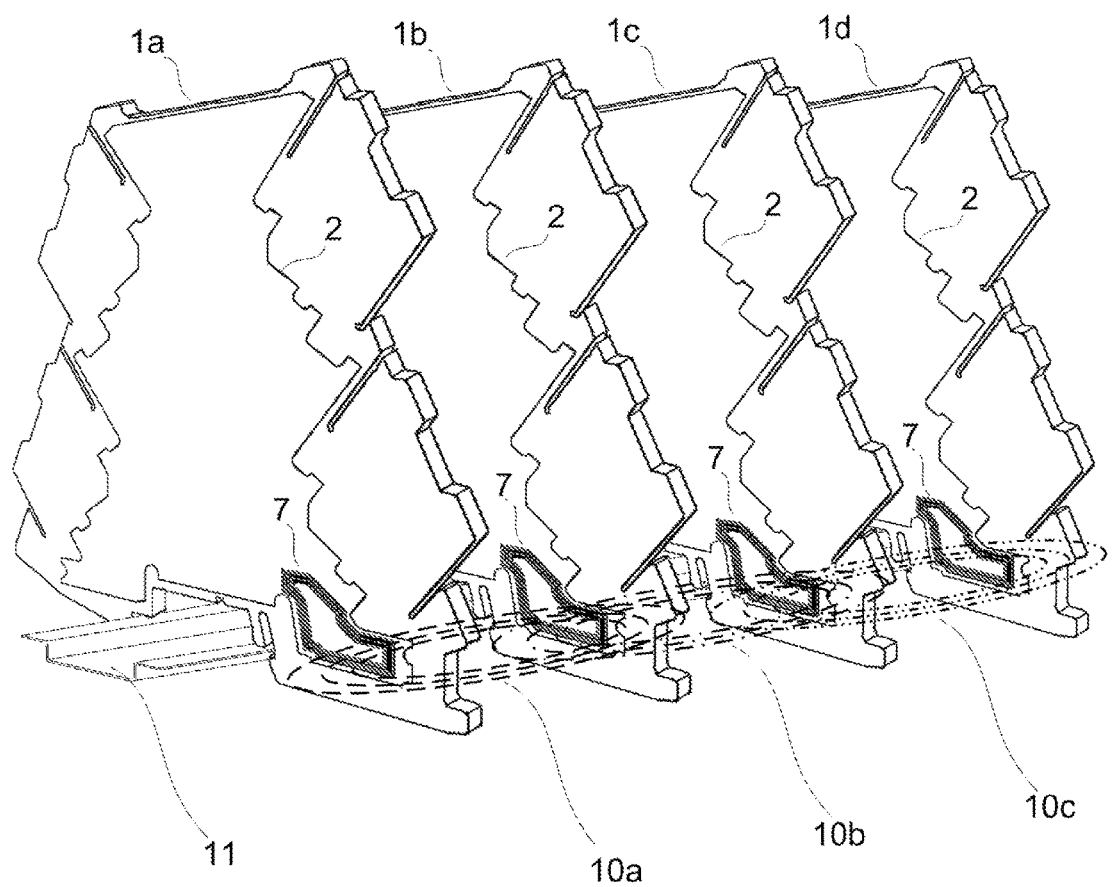
FIG. 4 shows an exploded schematic representation of a plurality of electrical interface modules according to exemplary embodiments of the invention in relation to one aspect of the invention.

FIGS. 2, 3 and 4 show various views of different embodiments. The electrical interface module IM is suitable for mounting on a mounting rail 11. One example of a mounting rail 11 is a cap rail.

In the embodiment that is shown in FIG. 2, the (planar) antenna 7 is arranged in the vicinity of the mounting area for the mounting rail 11. This leaves more installation space for the actual interface components and the connections and displays in the region on the opposite side.

In the embodiment that is shown in FIG. 3, the (planar) antenna 7 is arranged in a region opposite from the mounting areas for the mounting rail 11. This facilitates communication with an external reading device RW, thus enabling it to communicate (i.e., exchange data) with the electrical interface module IM from a greater distance.

To a person skilled in the art, it is readily clear that other positions can also be provided between these two positions for the (planar) antenna 7 and the chip 6, thus obtaining an at least partial benefit from the respective advantages.

It is especially advantageous if adjacent electrical interface modules IM are arranged such that they are able to exchange data and/or power with other electrical interface modules IM located in the vicinity via the respectively integrated NFC IO interface. One exemplary arrangement thereof is shown in FIG. 4, which illustrates the desirable— but not necessary—case of the equal arrangement of the NFC interfaces at least in relation to the respective (planar) antennas 7. For the sake of example, FIG. 4 shows strungtogether electrical interface modules IM, each of which has its own housing 1a, 1b, 1c, . . . .

At least one carrier 2 is arranged within the housing, with a (planar) antenna 7 in turn located thereon. To simplify the illustration, exemplary magnetic field lines are respectively shown such as those which could form during the data and/or power exchange between the individual electrical interface modules IM. For example, the field lines 10a— represented by broken lines—could be formed by the first interface module IM, which is located in a housing 1a. For example, these field lines 10a can engage in the region of the (planar) antenna 7 of the second interface module directly adjacent to the first, so that power and/or data can be exchanged between the adjacent interface modules by means of the field. This is also possible in like manner for the second interface module, with the magnetic field lines 10b being shown here with dot-dashed lines for purposes of differentiation. The field lines can of course also be readily embodied such that they are also able to transmit power and data beyond an adjacent interface module. In this way, for example, gaps and/or defective modules can be bridged over, and/or, as will be described later, even identified as defective and/or reconfigured.

In one exemplary embodiment, the adjacent interface modules IM are embodied such that adjacent electrical interface modules IM form a logical data bus via the integrated interfaces IO that can be addressed and/or controlled by means of at least one head module or one master module with a higher control and/or monitoring device. For example, one of the interface modules can be assigned the function of a master module, or a special head module that acts as a master can be introduced on one side of adjacent electrical interface modules IM or between adjacent electrical interface modules IM.

In one embodiment, a provision is made, for example, that adjacent electrical interface modules IM form an ad hoc network, in which case one of the adjacent electrical interface modules IM assumes a master function and the other electrical interface modules IM adjacent thereto assume a slave function. For example, the middle electrical interface module IM in FIG. 4, which is represented by the housing 1b, or one of the outer electrical interface modules IM represented by housings 1a and 1c can assume the role of the master, with the remaining ones acting as a slave to the electrical interface module.

The selection of the master can be determined on the basis of a predetermined sequence, for example. For example, the selection can be based on one or more of the following criteria:
product data
configuration data
first operational interface module
priority
lapse of time.

It should be noted that the writing and/or reading device RW can of course also assume the master function, particularly in the case of wireless IO interfaces.

Moreover, the writing and/or reading device RW could also be connected to the last subscriber or even to a head module.

For the sake of example, one possibility for the selection of the master will be briefly illustrated with reference to a wired interface IO.

In the following, a CAN basis will be assumed for the IO interface as an example of a multimaster system. With a CAN basis for the IO interface, every subscriber can become the master, that is, the system is a so-called multimaster system. The subscribers of the multimaster system, i.e., the electrical interface modules IM, inter alia, send data with a certain ID that the other subscribers can analyze.

With CAN, the master function can be established quickly, for example, because bus access is granted only to the party having the highest priority in the case of simultaneous transmission. For example, this can be determined via the address, with the lowest address being the bus master, for example. In this case, the other subscribers can withdraw.

To achieve this, it can be ensured in a higher protocol layer, e.g., on the application level or the layer 7, that the other subscribers, i.e., other electrical interface modules IM, for example, can themselves only transmit if they are so requested by the respective master. In the event that the respective master is absent, a provision can then be made that another electrical interface module IM assumes this master function.

This would be advantageous, for example, if the master were determined by random in the case of a malfunction; in this case, and if the master module cannot terminate its transmission due to the determination of a higher-priority telegram (e.g., CAN), the other subscribers, for example the electrical interface modules IM, would have to wait until they received a request for transmission or the like from the new master which, in turn, can have been determined beforehand in the same manner, for example on the basis of the highest priority.

A provision can then be made, for example, for it to be ensured in the higher protocol layer that the electrical interface modules IM with slave function that did not come into play as a result of the failure of the previous master are now again sent a request for transmission.

Moreover, a provision can also be made for the adjacent electrical interface modules IM to exchange data by means of the IO interfaces by means of a higher network protocol, that is, for the IO interface in the ISO/OSI layer model to make only one or more of the deeper layers, e.g., the physical layer, available, whereas the upper layer or the upper layers are made available using a different protocol. Some examples of higher network protocols are Interbus, I²C bus, RS232, ASI, etc., with the physical layer of these network protocols being made available, for example, by the physical layer of an NFC IO interface.

In embodiments of the invention, a provision can also be made for the electrical interface modules IM to store at least portions of configuration data from at least one directly adjacent electrical interface module IM, and for the availability of this directly adjacent electrical interface module to be monitored. In FIG. 4, for example, the electrical interface module, which is represented by housing 1b, can monitor the directly adjacent electrical interface module IM, which is represented by housing 1c, or store at least part of the configuration data thereof. Monitoring can be performed in different ways, for example by monitoring whether communication is present, or through targeted queries. Although monitoring and storage were discussed in only one direction in the above example, a provision can of course also be made for monitoring of the other adjacent electrical interface module IO/1a to be performed as well. Moreover, this monitoring can also be set up such that it covers not only the directly adjacent electrical interface modules, but also more distant electrical interface modules. For example, a provision could be made for the first interface module IM/1a in FIG. 4 to also monitor the electrical interface module IM/1c.

If it is now found that the adjacent electrical interface module IM is defective, then the error can be forwarded to other interface modules. In particular, an error can be forwarded to a master module and/or a head module and displayed. Alternatively or in addition, a provision can also be made that the error is forwarded to other devices, for example a monitoring device.

If the affected electrical interface module is now replaced, a provision can be made for the storing electrical interface module IM/1b to now optionally check this inserted replacement electrical interface module IM/1c for suitability in relation to the stored configuration data by communicating via the interface.

If this kind of check is provided for and is successful, a provision can now be made for the stored configuration data to be transmitted to the replaced electrical interface module. Of course, this step can also be independent of a check.

Moreover, a provision can also be made for the respective storing adjacent electrical interface modules to compare the received configuration with the configuration still being stored and only permit an operational release of the exchanged interface module in the event of a successful equivalent configuration, for example through appropriate signaling by means of the interface IO, only once the configuration has been concluded and the completed configuration has been transmitted to them. Such a method could be advantageous, for example, for secure (sub)systems with a predetermined Safety Integrity Level, for example, SIL per IEC 61508. In addition, the replacement of defective modules is facilitated substantially, since no further outside control is now necessary, thus eliminating the expense of such an otherwise necessary configuration.

In another embodiment, the identification of a fault location in a failed electrical interface module IM within a plurality of adjacent electrical interface modules IM is made possible.

One possibility for determining the fault site is for adjacent electrical interface modules IM to form a logic chain. For example, the first electrical interface module or a head module or a master module can then determine the length of the chain by continuing to forward a signal in the chain from an electrical interface module IM to the next logical electrical interface module IM until either the end of the chain is reached or until forwarding elicits no reply. For example, the forwarded signal can contain a counter that may be incremented or decremented upon successful forwarding. The logical last member that can still be reached returns its place in the logical chain, so that the respective first electrical interface module or the master module or the head module can now make a comparison based on the previously known length of the logical chain as to whether it matches with the certain length of the chain, and if the location of the error cannot be identified on the basis of the reported last location as the location immediately subsequent to the last answered link in the chain.

In other alternative or additional embodiments, a provision can also be made that the immediately adjacent electrical interface modules IM monitor the state of an electrical interface module IM as described previously and, in the event of a malfunction, report the error to the first electrical interface module or the master module or the head module.

In the event that the master module fails, a provision can be made that the adjacent or even another electrical interface module assumes this function.

In the case of an error within the system, it is also possible to divide the station into two or n autarchic subsystems and to continue the local processing, for example with the exception of the failed component.

Insofar as reference is made above to an NFC interface, the invention is not limited to NFC; rather, it is merely an example of a near-field transmission technique. Another exemplary near-field transmission technique is RFID, for example, which can be used as an alternative to NFC.

Nor is the invention limited to the near-field transmission technique. The invention also enables wired bus systems by means of which the electrical interface modules are networked, with CAN or the like being used as the bus protocol.

LIST OF REFERENCE SYMBOLS

Electrical interface module IM
Memory MEM
Interface, NFC/RFID interface IO
Writing device, reading device RW
Housing 1; 1*a*, 1*b*, 1*c*
Carrier 2
Component regions 3*a*, 3*b*, 3*c*
Controller 4
Interface 5
Interface chip 6
Antenna (planar) 7
Mobile telephone, smartphone, tablet PC 8
(Magnetic) field lines 10*a*, 10*b*, 10*c*
Mounting rail 11

What is claimed is:

1. An electrical interface module, comprising:
    a memory device for storing data and an integrated interface that provides data to an external reading device;
    a carrier on which the memory device and the integrated interface are arranged, the electrical interface module being capable of exchanging data and/or power via other electrical interface modules in a vicinity of the electrical interface module via the integrated interface, wherein the electrical interface module and adjacent electrical interface modules form a logical data bus via respective integrated interfaces that allows the electrical interface module and the adjacent electrical interface modules to be at least one of addressed and controlled by at least one head module or a master module with at least one of a higher control device and a monitoring device.

2. The electrical interface module as set forth in claim 1, wherein the adjacent electrical interface modules form an ad hoc network in which one of the adjacent electrical interface modules assumes a master function and the other electrical interface modules adjacent thereto assume a slave function, with a selection of a master being determined on a basis of a predetermined sequence, and the selection containing one or more of the following criteria:
    product data
    configuration data
    first operational interface module
    lapse of time.

3. The electrical interface module as set forth in claim 1, wherein the adjacent electrical interface modules exchange data via the respective integrated interfaces using a higher network protocol.

4. The electrical interface module as set forth in claim 1, wherein the memory device stores at least portions of configuration data of at least one directly adjacent electrical interface module, and availability of this directly adjacent electrical interface module is monitored.

5. The electrical interface module as set forth in claim 4, wherein, if the directly adjacent electrical interface module is replaced, the electrical interface module supplies the replaced directly adjacent electrical interface module with at least the stored portions of the configuration data.

6. The electrical interface module as set forth in claim 4, wherein, if the directly adjacent electrical interface module is replaced, the electrical interface module compares previously stored portions of the configuration data with current configuration data of the replaced directly adjacent electrical interface module, and insofar as the compared configuration data match, the replaced electrical interface module is put into an operating mode.

* * * * *